US012667741B2

(12) United States Patent
Lepeshinsky et al.

(10) Patent No.: US 12,667,741 B2
(45) Date of Patent: Jun. 30, 2026

(54) FIRE EXTINGUISHING EQUIPMENT WITH FIRE NOZZLE

(71) Applicant: Jetex Innovation S.R.O., Jesenice-Osnice (CZ)

(72) Inventors: Igor Alexandrovich Lepeshinsky, Moscow (RU); Radim Snoza, Jesenice Osnice (CZ); Andrey Petrovich Belonogov, Moscow (RU); Alexander Anatolyevich Migachev, Moscow (RU)

(73) Assignee: Jetex Innovation S.R.O., Jesenice-Osnice (CZ)

( * ) Notice: Subject to any disclaimer, the term of this patent is extended or adjusted under 35 U.S.C. 154(b) by 666 days.

(21) Appl. No.: 17/917,652

(22) PCT Filed: Jan. 28, 2021

(86) PCT No.: PCT/CZ2021/000004

§ 371 (c)(1),
(2) Date: Oct. 7, 2022

(87) PCT Pub. No.: WO2021/204306

PCT Pub. Date: Oct. 14, 2021

(65) Prior Publication Data

US 2023/0142120 A1 May 11, 2023

(30) Foreign Application Priority Data

Apr. 10, 2020 (RU) .......................... RU2020113289
Nov. 18, 2020 (CZ) ................................ CZ2020-616
(Continued)

(51) Int. Cl.
*A62C 31/12* (2006.01)
*A62C 99/00* (2010.01)

(52) U.S. Cl.
CPC .......... *A62C 31/12* (2013.01); *A62C 99/0036* (2013.01)

(58) Field of Classification Search
CPC .......................... A62C 31/12; A62C 99/00369
(Continued)

(56) References Cited

U.S. PATENT DOCUMENTS 2,988,151 A * 6/1961 Dion-Biro .............. A62C 5/002
261/DIG. 26
4,278,132 A * 7/1981 Hostetter ................. A62C 5/00
261/DIG. 26
(Continued)

FOREIGN PATENT DOCUMENTS

DE 102006035349 A1 4/2008
EP 0305251 A1 3/1989
EP 1900438 A1 3/2008
EP 2532391 A1 12/2012
RU 2236876 C1 9/2004
RU 164658 U1 9/2016

*Primary Examiner* — Chee-Chong Lee
(74) *Attorney, Agent, or Firm* — Dykema Gossett PLLC

(57) ABSTRACT

In one structural arrangement the fire fighting nozzle (18) is connected to the compressor (7) of a gas-turbine engine (4). In the second structural arrangement the fire nozzle (18) is connected to a screw compressor (50) connected to a diesel engine (47). Both types of fire extinguishing equipment have the same fire nozzle (18), whose mixing chamber (19) for the generation of a high-speed two-phase dispersive stream (21) of a bubble structure is made in the form of a block of mixers (35) with front and rear partitions (36,37), in between which pipe mixers (38) are located. Each mixer (38) is equipped with a confusor (43) and a diffusor (44). On the outlet from the fire nozzle (18) the high-speed dispersive stream (21) contains droplets of sizes 100-300 μm. The fire nozzle (18) has a mixing chamber (19), divided by partitions (36, 37) to a water supply chamber (40), air supply chamber (41) and dispersing chamber (39). The dispersing chamber (39) narrows into a gas-dynamic propelling nozzle (20), from which a high-speed dispersive stream (21) comes out.
(Continued)

The fire nozzle (18) is connected to a rotating mechanism (22) which rotates it vertically and horizontally. The control unit (2) is equipped with a remote control (34) and connected to an generator (3).

11 Claims, 10 Drawing Sheets

(30) Foreign Application Priority Data

| | | |
|---|---|---|
| Dec. 9, 2020 | (CZ) | CZ2020-661 |
| Jan. 25, 2021 | (CZ) | CZ2021-29 |

(58) Field of Classification Search
USPC .......... 169/24
See application file for complete search history.

(56) References Cited

U.S. PATENT DOCUMENTS

| | | | | | |
|---|---|---|---|---|---|
| 4,345,654 | A * | 8/1982 | Carr | B05B 7/24 169/14 |
| 4,474,680 | A * | 10/1984 | Kroll | B01F 23/291 261/DIG. 26 |
| 4,492,525 | A * | 1/1985 | Bilyeu | F04B 49/06 261/DIG. 26 |
| 4,729,434 | A * | 3/1988 | Rohrbach | A62C 27/00 239/113 |
| 4,981,178 | A * | 1/1991 | Bundy | A62C 5/02 261/DIG. 26 |
| 9,186,531 | B2 * | 11/2015 | Combs | A62C 31/28 |
| 2012/0305272 | A1 * | 12/2012 | Grandpierre | B05B 7/0018 169/14 |

* cited by examiner

FIRE EXTINGUISHING EQUIPMENT WITH FIRE NOZZLE

CROSS-REFERENCE TO RELATED APPLICATIONS

This application is a national stage filing based upon International application No. PCT/CZ2021/000004, filed 28 Jan. 2021 (the '004 application). This application claims priority to Russia application no. RU2020113289, filed 10 Apr. 2020 (the '289 application). This application claims priority to Czechia application no. PV 2020-616, filed 18 Nov. 2020 (the '616 application). This application claims priority to Czechia application no. PV 2020-661, filed 9 Dec. 2020 (the '661 application). This application claims priority to Czechia application no. PV 2021-29, filed 25 Jan. 2021 (the '129 application). The '004 application, the '289 application, the '616 application, the '661 application and 129 application are all hereby incorporated by reference as though fully set forth herein.

FIELD OF AT

The present invention relates to a fire extinguishing equipment with fire fighting nozzle, designed in the form of a gas-dynamic nozzle, connected to a mixing chamber, which has supply inlets of a gaseous working medium and liquid, where chambers are arranged for the generation of a two-phase bubble-structured stream.

PRIOR STATE OF THE ART

Known in the art is a fire nozzle, made in the form of a gas-dynamic nozzle connected to a mixing chamber with inlets for supply of a gaseous working medium, liquid and foaming agent (Patent RU for utility model no. 164658, MPT A62C 3/00, publ. 9 Oct. 2016).

The drawbacks of the design are the structural complexity due to the existence of three separate inlets of air, water and foaming agent, the incapacity to work without a foaming agent and the limited possibilities to provide for a fine dispersion, the performance and the reach of the stream.

The most analogous engineering solution to the proposed one is a fire nozzle, where the gas-dynamic nozzle is connected to a mixing chamber designated for mixing liquid and gaseous working medium connected to a liquid supply, that has an inlet for the supply of a gaseous working medium. The liquid and gas mixer of the fire nozzle is made in the form of a chamber for the generation of a two-phase dispersion stream with inlets for supply of liquid and gas and a chamber for the generation of a two-phase bubble-structured stream connected to inlets for the supply of liquid and gas (Patent RU no. 2236876, MPT A62C 3/00, published on 27 Sep. 2004).

The drawbacks of the design are the structural complexity and high consumption of the extinguishing medium to achieve an effective reach to extinguish fires of high radiation intensity high-rise fires etc.

SUMMARY OF THE INVENTION

The said drawbacks are removed or significantly limited in case of the fire extinguishing equipment with fire fighting nozzle according to the present invention, which is based on the fact, that the fire nozzle in the form of a gas-dynamic nozzle is connected to a mixing chamber fitted with inlets for the supply of a gaseous working medium and liquid, where the chamber for the formation of a two-phase bubble-structured stream is, connected to inlets for the supply of liquid and gas, made in the form of a mixing block, comprising a front partition and a rear partition, in between which pipe mixers are installed. The rear partition is in a chamber with separate liquid and air inlets. The air inlet is between the partitions. Inlet orifices of all mixers comprise confusors and they are connected to a chamber for the supply of liquid. In the pipe mixers, from the side of the rear parallel partition are side orifices, on the opposite sides of the mixers are diffusers, with their outlet ends placed in the orifices of the second partition with gaps. For a given water flow $P_w$ (l/s) the number of mixers is determined as $P_w$(l/s):(1.9-: −2.1) and the air flow as $P_a$ (l/s)×(40-:−28).

In more detail:

The fire nozzle of a cylindrical shape comprises a mixing chamber, which is in the direction of flow fitted with a rear partition and a front partition inserted into a chamber for the supply of water, a chamber for the supply of air and a dispersing chamber. The chamber for the supply of water is equipped with the supply of water and foam. The chamber for the supply of air is equipped with an inlet of a high-pressure air from the compressor. The dispersing chamber narrows into a gas-dynamic propelling nozzle. The fire nozzle with its particular structure is developed, to reduce the quantity of the extinguishing medium and to reduce the extinguishing time very significantly as well. The foam is mechanically adjusted, so as to reduce the extinguishing time up to ten times. Separate chambers for the supply of air and water, possibly with foam, are designed, to produce the resulting effect of a high-speed dynamic stream with an extreme extinguishing efficiency.

In the example embodiment between the rear partition and the front partition of the mixing chamber a mixing block is situated, equipped with mixers, in between which gaps are situated. This structural solution allows for the generation of a two-phase gas-dynamic high-speed stream, which is formed right in this part of the fire extinguishing equipment.

Each mixer is located between the rear partition with orifices for air suction and the front partition with gaps, where the mixer is equipped with a confusor and a diffusor. The internal structural arrangement of the individual parts of each of the mixers allows to generate a two-phase gas-dynamic high-efficiency extinguishing stream.

It was found by way of an experiment, that extinguishing fires by a far-reach dispersion stream is most effective when droplets sizes range from 100 μm to 300 μm, for which the air to water weight ratio must be 1:(40-28), and the water flow through one mixer 1.9-2.1 l/s. When several parallel-working mixers are used instead of a single mixer an extinguishing stream with a longer reach is formed. To attain a water flow in the mixing chamber of 60-66 liters/s a block of 30-33 mixers must be used.

The mixer consumption was selected by way of an experiment based on a consideration of a liquid and gas mixing evenly. It is affected by the speed of liquid, pressure and volume of air supplied into the mixing chamber. The speed of liquid depends on the cross section and pressure, generated by the pump. The flow of 2 l/s has been selected for water pressure of about 8-10 bar.

The fire extinguishing equipment has a control unit, which is equipped with a remote control. The fire nozzle is connected to a rotating mechanism providing for its vertical and horizontal rotation. The water or foam inlet into the mixing chamber is connected through a high-pressure water pump with a tank of foaming agent.

The fire extinguishing equipment with fire nozzle may in one preferred embodiment according to the present invention have the fire nozzle connected to a compressor of a gas-turbine engine. The advantage in this case is the connection of the fire nozzle through a flap valve to the compressor of a gas-turbine engine with the gas turbine, where the gas turbine is equipped with a combustion chamber for fuel combustion and with a heat exchanger for the cooling of the combustion chamber. The combustion chamber is connected to the compressor and a fuel system. The pump for water injection is connected to jets, specifically to the jet for the spraying of water into the compressor of the gas-turbine engine, and to the jet for the injection of a superheated steam into the combustion chamber of the gas-turbine engine and it is also connected to the jet for water injection into exhaust fumes of the gas-turbine engine.

The fire extinguishing equipment with fire nozzle can have in another preferred embodiment according to the present invention the fire nozzle connected to a screw compressor connected to a diesel engine. In this case the fire nozzle is connected to two basic circuits, specifically to the air treatment circuit with a diesel engine with a screw compressor and to the water and foam treatment circuit including a diesel engine connected to a high-pressure water pump.

The air treatment circuit includes a fire nozzle connected through a mixing chamber to an inlet of high-pressure air from the compressor and this inlet is connected to an air control electromagnetic flow valve, which is connected through an air swing check valve to the screw compressor propelled by the diesel engine, equipped with an electro generator and an accumulator.

The engine is equipped with a control and synchronization unit and it is connected to a fuel system. The mixing chamber is supplied with air and water, or possibly with foam. The inlet of high-pressure air from the compressor in combination with the air control electromagnetic flow valve provides for an uninterrupted and regulated supply of air into the mixing chamber. The air check flap valve protects the compressor from flooding with water, in particular in case of a breakdown. The control and synchronization unit provides for a regulated and uninterrupted operation of both diesel engines.

The water and foam treatment circuit includes a fire nozzle connected through the mixing chamber to the water and foam supply. The supply is connected to a water and foam mixer, which is connected to an injector and electromagnetic flow valve of extinguishing foam, connected to a tank of foaming agent. This arrangement provides for the possibility of extinguishing works in separate regimes, either extinguishing with water alone or with water with foam. The water and foam mixer is connected to a water control electromagnetic flow valve, connected to a water swing check valve, connected to a high-pressure water pump, connected to a diesel engine gearbox.

This arrangement with a water swing check valve ensures, there will be no damage to the water circuit by the pressure of air from the compressor.

The diesel engine is equipped with a generator and an accumulator and it is connected to a control and synchronization unit and it is linked with a fuel system. This arrangement is advantageous, since there is no need, like for an aeronautical compressor, of a tank of special fuel because the fire extinguishing equipment according to the present invention uses only one type of fuel, e.g. diesel.

The high-pressure water pump can be connected to a utility water collector and a suction strainer. Depending on the circumstances it is possible to use natural water reservoirs. The fire extinguishing equipment works even with seawater.

The high-pressure water pump may be connected to a drinking water collector connected to a municipal water supply network. If no utility water is available the fire extinguishing equipment can be connected to a water supply network.

The fire extinguishing equipment with fire nozzle is apart from the two circuits equipped with a remote control of a control unit, connected to a rotating mechanism of the fire nozzle, where the control unit is connected to a thermal image detection. The fire extinguishing equipment can be remotely controlled by computer, or by phone. The operation of the rotating mechanism is fully automatic. The thermal image detection determines the volume and direction of the extinguishing stream. The control unit can be controlled remotely as well, e.g. from a control room, from a supervision center.

The main advantage of the fire extinguishing equipment design according to the present invention is, that it allows to extinguish fires up to a height of 80 m, which is of a particular advantage in case of high-rise buildings and to extinguish fires from larger distances, up to 120 m, which is an advantage in case of an inaccessible terrain, or high temperatures, or a potential risk of explosion etc. The fire extinguishing equipment is a typified container, which can be carried by any truck of the appropriate size. The fire extinguishing equipment is mobile and can be transported if need be, e.g. by truck.

Another big advantage of this invention is, that the produced extinguishing mixture of water and air, which is highly effective in extinguishing fires and attains a particularly long reach of the extinguishing medium, not attainable in the usual ways. Diesel engines are commonly available, easy to maintain and to operate and by controlling these engines, a regulated dispersion stream is produced. The air circuit separated from the water and foam circuit contributes to a safe operation and easy-to-navigate and simple maintenance. The diesel engine combined with a screw compressor provides for an uninterrupted and regulated air supply. The diesel engine connected to a high-pressure water pump provides for the required volume of liquid in proportion to air.

Having perused scientific and technical literature and patent documents the applicant has not found any other engineering solutions in an analogous direction with a similar set of essential features. The proposed fire nozzle can be produced using a known technology from known materials.

The proposed fire extinguishing equipment, made according to the present invention and based on the principles of a gas-dynamic technology, made it possible to create an innovative and unique fire extinguishing equipment of a very high performance with a two-phase dispersed stream. To the best of our knowledge, there is no similar fire extinguishing equipment of such a type in the world, which would be able to fight high-intensity fires in a large area so effectively. The fire extinguishing equipment according to the present invention also uses different media, it is suitable for extinguishing even extremely difficult fires, including extinguishing forest fires, extinguishing of oil spills, extinguishing of facilities with increased radiation, extinguishing construction site fires or high-rise fires, in case of poor accessibility of the site, such as due to a blocked road, in chemical plants and many others.

The fire extinguishing equipment according to the present invention is characterized by a high mobility, complies with the requirements for prompt carriage and presentation, as well as an easy installation and it can be used in a wide range of conditions. It is manufactured, for example as a series container 20 feet (6.096 m) long, which ensures versatility and comfortable placement of the system on mobile carriers—truck, rail or sea, as well as on stationary platforms of fire extinguishing systems, also in areas, where the strictest of requirements are applied to fire safety, such as oil refineries, tanker fleets, sea ports, airports and many others.

The fire extinguishing equipment according to the present invention has other advantages:

- safer passing of the distance to the seat of fire, because the fire nozzle provides for the reach of the extinguishing medium to a large distance of about 85 to 120 meters;
- tearing apart of the flame is ensured by a high speed of the stream, which reaches up to 100 m/s;
- prevention of access of an oxidizer (air) into the zone of fire;
- conduction of heat away from the zone of fire;
- owing to the dimensions of droplets in the extinguishing stream in the order of sizes of about 150-350 μm, an extremely fast evaporation then occurs, compared to the existing extinguishing systems.

Compared to the existing extinguishing devices, the fire extinguishing equipment according to the present invention allows to:

- provide the working fluid on the outlet with flow and speed, which is multiple times higher than the one of the existing technologies;
- provide for the supply of minimum required volume of the extinguishing liquid to long distances, practically by doubling the length of reach;
- provide for an optimum dispersion of droplets in the stream or particles in the seat and surroundings of the fire (size ~150 μm);
- reduce the consumption of the extinguishing medium per unit of the area of fire to one half;
- extinguish fires, which are difficult or impossible to extinguish from a short distance;
- shorten the fire extinguishing time;
- reduce damages caused by the fire extinguishing means used.

The fire extinguishing equipment has a reach up to 120 meters and ensures the height of the extinguishing stream of up to 80 meters. The water supply pressure required is about 1-1.3 MPa. Horizontal rotation of the fire nozzle is up to 350 degrees. The fire extinguishing equipment can work within the temperature range from minus 40° C. to plus 40° C. The ascent/descent angle of the fire nozzle is +65/−5 degrees. Water consumption is about 60 l/s.

The applicants compared tests of the fire extinguishing equipment according to the present invention with standard fire extinguishing device. Fire of an oil storage on the area of about 620 $m^2$ and about 28 m in diameter was being extinguished.

When the fire extinguishing equipment according to the present invention was used only one fire extinguishing equipment according to the present invention was used, without a helicopter with the extinguishing medium, and with 2 operators the fire was extinguished in 2.4 minutes.

When standard fire extinguishing devices were used 111 fire extinguishing trucks, 3 helicopters with the extinguishing medium, about 300 firemen were used. The fire was extinguished in about 17 hours.

Other virtues of the fire extinguishing equipment according to the present invention are shown in the examples of embodiment.

OVERVIEW OF THE FIGURES IN DRAWINGS

The subject matter of the fire extinguishing equipment is described in detail below in the example embodiment and explained in the drawings, which show a nonrestrictive example of the application of this equipment, where FIG. 1A shows a block scheme of the fire extinguishing equipment with fire nozzle, connected to a compressor of a gas-turbine engine;

EXAMPLES OF THE INVENTION EMBODIMENT

Example 1

Figure 1A:
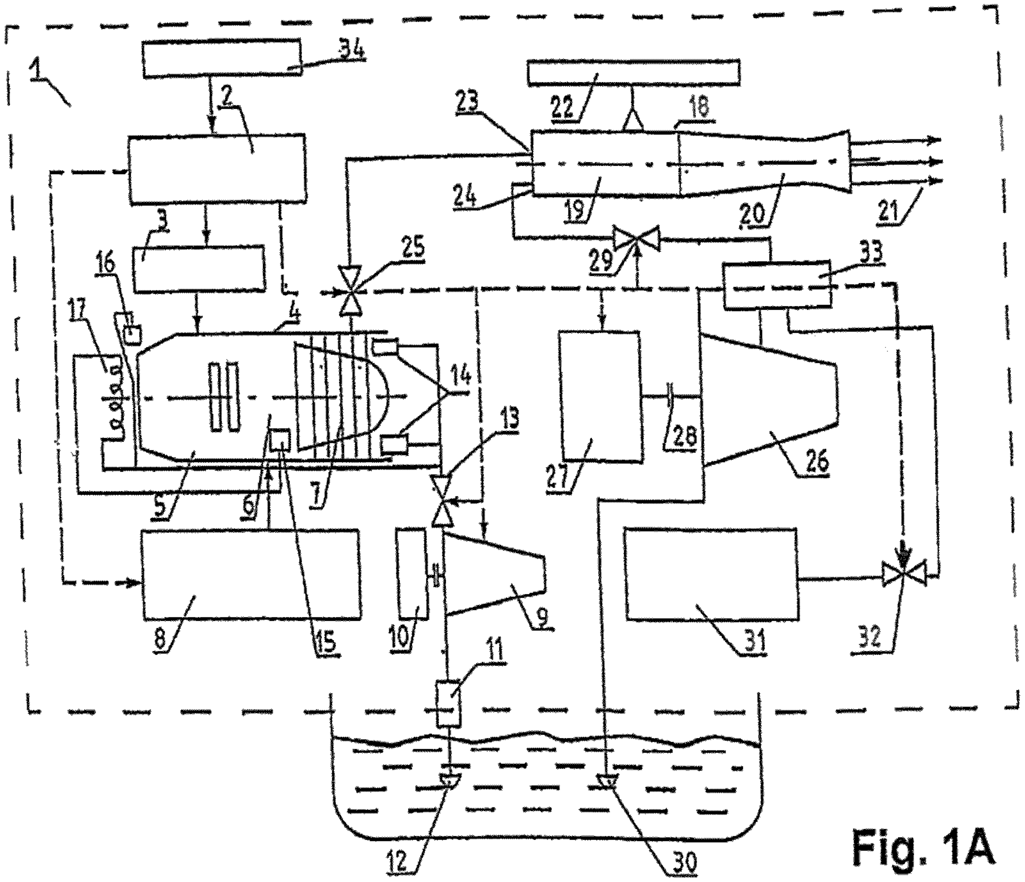
FIG. 1B shows a block scheme of the fire extinguishing equipment fire extinguishing equipment with fire nozzle, connected to a screw compressor, connected to a diesel engine.

(FIGS. 1A, 2-6)
Fire Fighting Nozzle 18 Connected to a Compressor 7 of a Gas-Turbine Engine 4.

Figure descriptions: mounting frame 1, control unit 2, electro generator 3 of the engine 4 with a gas turbine, turbine 5 of the engine 4, combustion chamber 6 of the engine 4, compressor 7 of the engine 4, fuel system 8 of the engine 4, pump 6 for water injection, drive 10 of the pump 9 for water injection, filter 11 of fine water purification, collector 12 of water, turn-on valve 13 for water injection, jets 14 for spraying water into the compressor 7 of the engine 4, jets 15 for the injection of superheated steam into the combustion chamber 6 of the engine 4, jet 16 for water injection into exhaust fumes of the engine 4, heat exchanger 17, fire fighting nozzle 18, mixing chamber 19, propelling nozzle 20, gas-droplet dispersed stream 21, rotating mechanism 22 of the fire nozzle 18, inlet 23 of compressed air into the mixing chamber 19, inlet 24 of water or foam into the mixing chamber 19, controllable air non-return flap 25, high-pressure water pump 26, drive 27 of the water pump 26, clutch 28, valve 29 for shutting off water or foam mixture, collector 30 of water for high-pressure pump 26, tank 31 of foaming agent, valve 32 on the main foam supply, mixer 33 of foam, remote control 34, block 35 of mixers, rear partition 36, front partition 37, mixer 38, dispersing chamber 39, chamber 40 for the supply of water, chamber 41 for the supply of air, gaps 42 between the partition 37 and mixers 38, confusor 43 and diffusor 44 of the mixer 38, cylindrical component 45 of the mixer 38, orifices 46 in the partition 37 for air suction of the mixer 38.

FIG. 1A shows a block scheme of the fire extinguishing equipment with fire nozzle 18, connected to the compressor 7 of a gas-turbine engine 4.

The fire extinguishing equipment is put in a mounting frame 1 marked with a circumferential frame with a dashed line. Inside the mounting frame 1 full lines depict air and water pipes and broken lines mark electric installations.

The fire extinguishing equipment comprises a control unit 2 equipped with a remote control 34 to control the equipment. The control unit 2 is connected to an electro generator 3 of the engine 4 with a gas turbine 5, which propels the compressor 7. The gas turbine 5 is equipped with a combustion chamber 6 for fuel combustion and a heat exchanger 17 for the cooling of the combustion chamber 6. The combustion chamber 6 is connected to the compressor 7 and a fuel system 8.

The pump 9 for the injection of water is equipped with a drive 10, a suction filter 11 for fine water purification and a collector 12 of water.

Over the pump 9 for the injection of water is placed a turn-on valve 13. The turn-on valve 13 is connected to a jet 14 for the spraying of water into the compressor 7 of the gas-turbine engine 4, and it is further connected to a jets for the injection of superheated steam into the combustion chamber 6 of the gas-turbine engine 4 and it is also connected to a jet 16 for the injection of water into exhaust fumes of the gas-turbine engine 4. The turn-on valve 13 is also connected to a high-pressure water pump 26, which is connected by a clutch 28 to a drive 27 of the water pump 26.

The high-pressure water pump 26 is connected to a water collector 30. The high-pressure pump 26 is also connected to a foam mixer 33 which is connected through a valve 32 of the main foam supply with a foaming agent tank 31. The foam mixer 33 is connected to a valve 29 for shutting off water or foam mixture for the water or foam inlet 24 into the mixing chamber 19 of the fire nozzle 18.

The compressor 7 of the gas-turbine engine 4 is connected to a controllable no-return air flap 25, which is connected to an air/gas inlet 23 from the compressor 7 of the gas-turbine engine 4. The mixing chamber 19 of the fire nozzle 18 is connected to a rotating mechanism 22. The fire nozzle 18 is aligned with a gas-dynamic propelling nozzle 20 for the generation of a high-speed dispersive stream 21.

The control unit 2 is connected to a fuel system 8 for the control of fuel supply into the combustion chamber 6 of the gas-turbine engine 4. The control unit 2 is connected to all shut-off and turn-on valves, specifically the valve 13 for the injection of water into the compressor 7, valve 29 for shutting off water or foam mixture into the foam mixer 33 and valve 32 on the main foam supply. The control unit 2 is also connected to a controllable air non-return flap 25, pump 9 for the injection of water and drive 27 of the high-pressure water pump 26.

Figure 2:
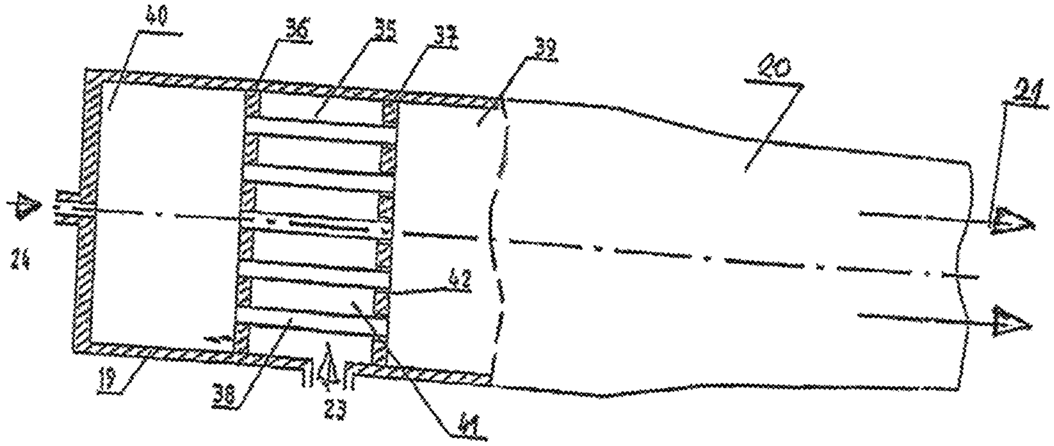
FIG. 2 shows a longitudinal section of the fire nozzle.

FIG. 2 shows a schematic drawing of the fire nozzle 18 in longitudinal section. The fire nozzle 18 of a cylindrical shape contains a mixing chamber 1, which is in the direction of flow, indicated with an arrow, split by a rear partition 36 and a front partition 37 to chambers 39, 40, 41; specifically in the direction of flow to the chamber 40 for the supply of water, the chamber 41 for the supply of air and the dispersing chamber 39. The chamber 40 is equipped with a water and foam inlet 24. The chamber 41 is equipped with an inlet 23 of compressed air from the compressor 7 (not depicted here). The dispersing chamber 39 narrows into a gas-dynamic propelling nozzle 20, from which a high-speed dispersive stream 21 comes out.

Between the rear partition 36 and the front partition 37, a mixing block 35 is situated, equipped with mixers 38, in between which gaps 42 are situated.

Figure 3:
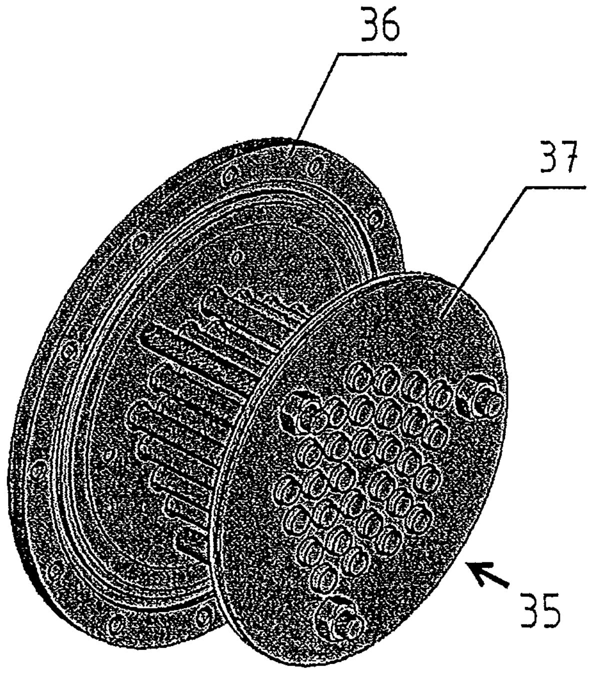
FIG. 3 shows an axonometric view of the block of mixers in detail.

FIG. 3 shows a detail of an axonometric view of the mixing block 35 with the rear partition 36 and the front partition 37.

Figure 4:
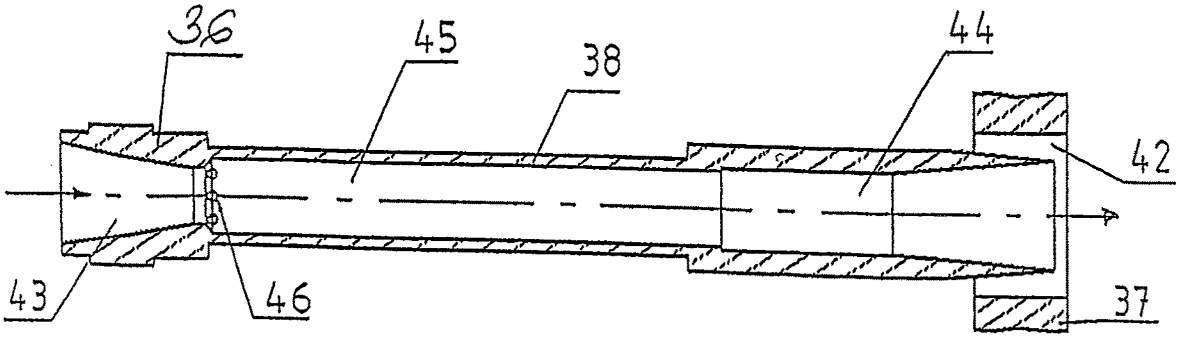
FIG. 4 shows a longitudinal section through the pipe mixer.

FIG. 4 shows one mixer 38 in longitudinal section, situated between the rear partition 36 with orifices 46 for the suction of air and the front partition 37 with gaps 42. The mixer 38 is equipped with a confusor 43 and a diffusor 44.

Figure 5:
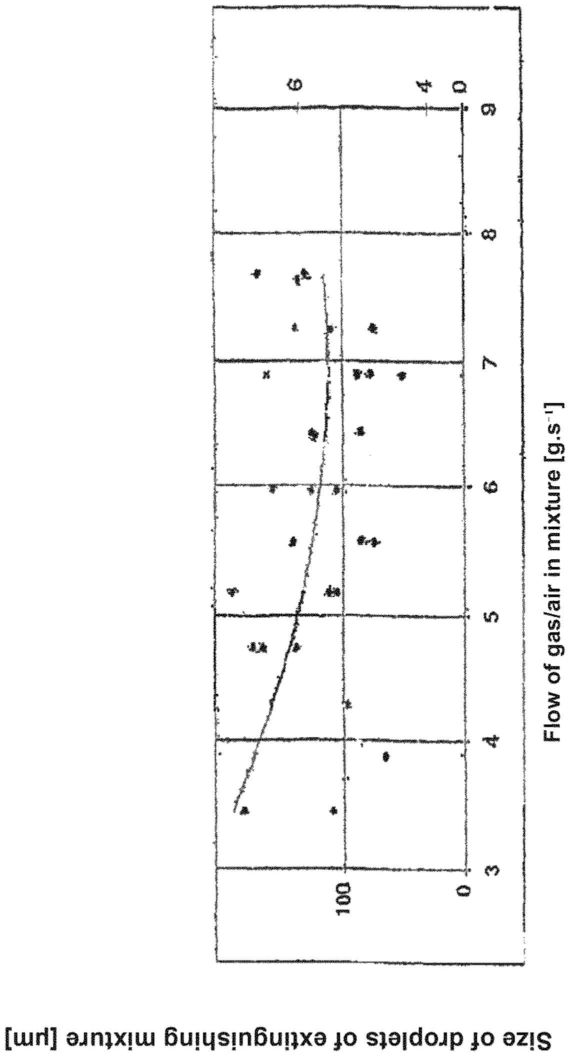
FIG. 5 shows on the vertical axis the size of droplets on the outlet of the mixer in micrometers, on the horizontal axis the flow of gas (air) through the mixer in grams per second.

As shown in the chart in FIG. 5, the smallest dispersion is attained with the air flow through one mixer 38 of 50-70 g/s, but the selected engine 4 with a gas turbine 5 provides for 1.35-1.5 kg/s, and thus it is necessary to use 33 (thirty three) mixers 38 for the given water flow, and so dimensions of the mixer are selected providing for the air supply from 41 to 45 g/s.

A through-diameter of the mixer 38 ranging from 10 to 12 mm has been selected (FIG. 6) because of the minimum size of droplets of 150 micrometers at the water pressure of 10-12 bar and water flow of 60-70 l/s, which is ensured by the selected high-pressure water pump E.

The Fire Extinguishing Equipment Works as Follows:

Internal diameter (caliber) of the mixer 38 has been selected based on the calculation of the water flow set point. Water consumption is selected based on the proportion of one weight part of air (gas) to 40-50 weight parts of water (liquid). Air volume is selected in regard to the required dispersion of droplets. The sizes of droplets range from 100 to 300 μm.

For the given dispersion of droplets an air flow of 50-70 g/s is necessary where the water flow through one mixer is 2 000 g/s (2 kg/s). For the water flow of 60-66 l/s through the mixing chamber 19 a block of 33 (thirty-three) mixers 38 is used.

The equipment is made ready for work in advance. The tank 31 gets filled with foaming agent. If the equipment is not stationary and it is in the required distance from the source of fire, the equipment will be carried into the fire extinguishing zone.

Then the engine 4 with a gas turbine 5 is started. The engine 4 with a gas turbine 5 is propelled by an electro generator 3. A drive 27 of the high-pressure water pump 26 is started, which will set through the clutch 28 the water pump 26 into operation.

The high-pressure water pump 26 supplies the extinguishing liquid by pipe from an external source and from the compressor 7 of the engine 4 with a gas turbine 5 compressed air is blown in. In the mixing chamber 19 a mixture of droplets and gas is formed, which gains the operating speed in a gas-dynamic propelling nozzle 20.

For the maximum fire ground coverage the fire nozzle 18 is rotated vertically and horizontally using a rotating mechanism 22. The parameters of the gas-dynamic stream can be changed by setting the volume and pressure of supplied liquid, as well as by adjusting the gas flow and pressure by the control unit 2, which controls the air no-return flap 25 and valve 29 for shutting off water or foam mixture.

When easily combustible materials are being extinguished a foaming agent, with which the tank 31 is filled is used. The valve 32 is opened and the foaming agent gets through the foam mixer 33 together with water into the fire nozzle 18. On the outlet of the fire nozzle 18 a foam is formed, which crosses a distance of more than 100 meters, covers the seat of fire and prevents from the access of air.

If the surrounding temperature is more than 20 degrees Celsius the loss of performance of the engine 4 with a gas turbine 5 is compensated by switching on the drive 10 of the water injection pump 9, which through the water collector 12 starts supplying water through the fine filter 11 and jet 14 into the compressor 7 of the engine 4 with a gas turbine 5, and through jets 15. The water, which passed through the heat exchanger 77, gets injected as a steam into the combustion chamber 6 of the engine 4 with a gas turbine 5, and through jets 16 it gets into the stream of exhaust fumes of the engine 4 with a gas turbine, to reduce its temperature.

The chamber 41 for the supply of air is separated from the chamber 40 for the supply of water by a rear partition 36 of the block 35 of mixers 38 and from the dispersing chamber 9 by a front partition 37 of the block of 35 mixers. The mixers 38 are fixed on a rear partition 36 of the mixing block 35 and enter by a gap 2 with the front part into the orifices 42 of the front partition 37 of the block 35 of mixers. The mixers 38 are pipe components with flow cross-section selected by way of an experiment. On the rear side there is a confusor 4 (liquid inlet) located, behind which is a cylindrical component 45 (of a constant cross-section) with radial-placed orifices 46 for air suction and with a diffusor 44.

Led to the inlet 24 for supply of liquid into the water chamber 40 of the mixing chamber 19 is either water under pressure from the pump 26, or a mixture of water and foaming agent from the foam mixer 33, which gets into confusors 43 of the mixers of the block 3 and goes through the cylindrical component 45 of mixers 38 and then through diffusors 44 of the mixers 38. At the same time a negative pressure is generated in the mixer 38, which facilitates air suction through the orifices 46 of mixers 35 from the chamber 41 for the supply of air to the mixing chamber 19. Air/gas comes out of the compressor 7 of the engine 4 with a gas turbine 5 and through an air non-return flap 2 through the compressed air inlet 23 it is led into the air supply chamber 41 of the mixing chamber 9. A part of air goes through the gaps 42 between mixers 35, and through the walls of the orifices 42 of the rear partition 37 of the block 35 of mixers it enters the dispersing chamber 39 of the mixing chamber 19 of the fire nozzle 18.

In the process the gaseous medium is divided into two streams: the first one forms a two-phase bubble-structured stream and the second one propels in the gas-dynamic propelling nozzle 20 a high-pressure stream 21 of a dispersive structure. The two-phase bubble-structured stream is generated by mixing the first gas stream with a liquid in the cylindrical component 45 or after its prior acceleration for the reduction of pressure in the dispersing chamber 3 of the mixing chamber 19.

The bubble stream from each of the diffusers 44 of mixers 38 is led into the dispersing chamber 39, where intensive destruction takes place and its structure gets changed, possibly generating shock waves, depending on the parameter values, i.e. the bubble structure is transformed to a dispersed structure with the formation of tiny droplets.

The second stream of gas at the same time enters the dispersing chamber 39 of the mixing chamber 19 of liquid and gas, where a mixture of droplets and gas is formed by mixing the second stream with the dispersed stream. The mixture of droplets and gas so formed is led into the gas-dynamic propelling nozzle 20, where it gains a predetermined speed and on the outlet from the nozzle 20 it forms a high-speed dispersive stream 21 with tiny dispersed droplets.

The applicant made and successfully tested prototypes of the proposed fire extinguishing equipment with fire nozzle 18. It has been proved by the tests, that the fire extinguishing equipment provides for reduction of the consumption of extinguishing liquid and foam; high dispersion of droplets of the extinguishing liquid; an uninterrupted operation under conditions of extremely high temperatures of the surrounding air up to plus 60 degrees Celsius.

Example 2

(FIG. 1B, 2-10)

The Fire Fighting Nozzle 18 is Connected to a Screw Compressor 50 Connected to a Diesel Engine 47

Figure 1B:
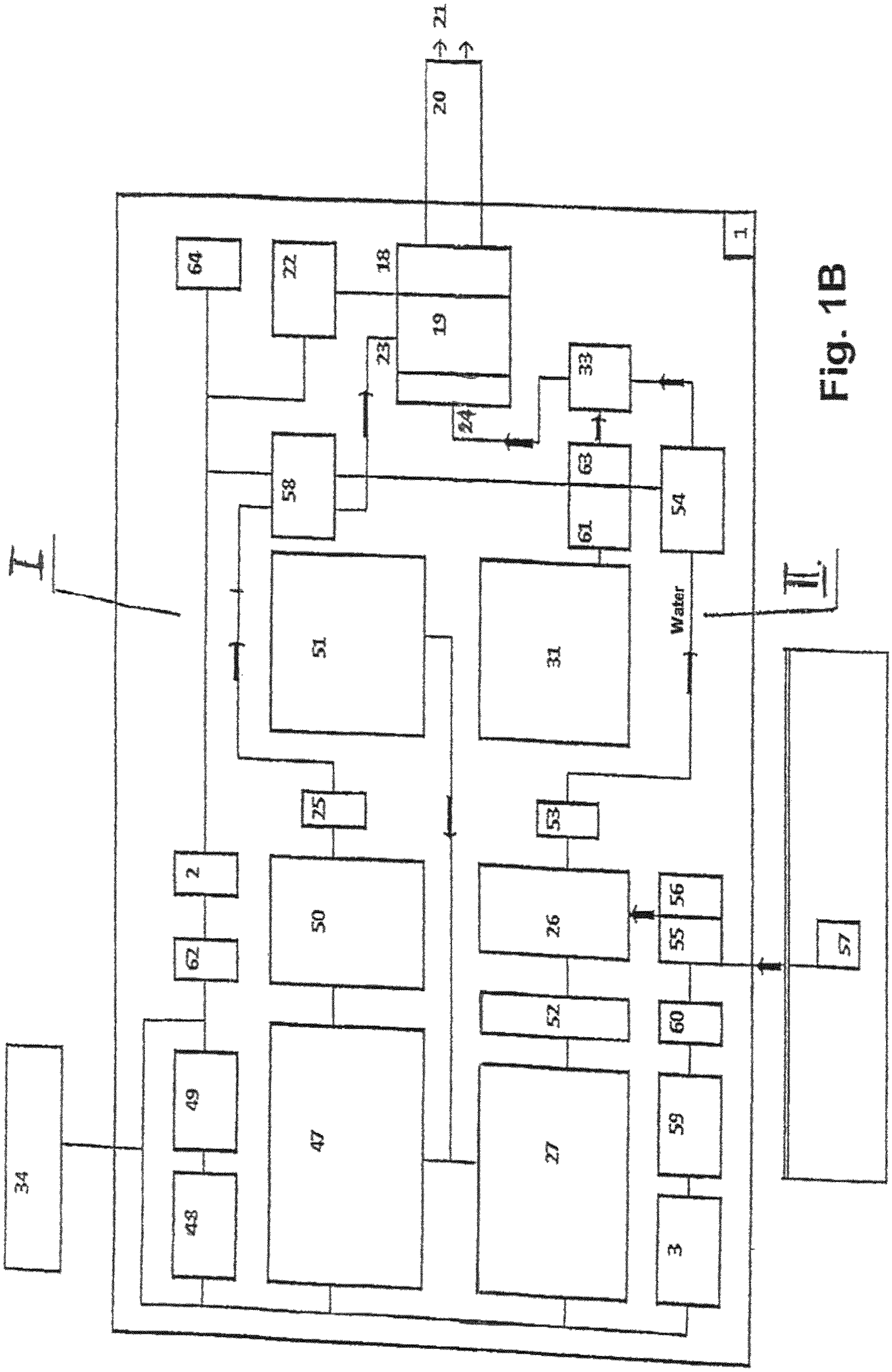

FIG. 1B shows a block scheme of the fire extinguishing equipment, with fire nozzle 18, which is connected to a screw compressor 50 connected to a diesel engine 47. The fire extinguishing equipment is placed on a structural mounting frame 1, which may be inserted into a classical typified container. The fire extinguishing equipment has two basic circuits, a circuit I of air treatment and a circuit II of water and foam treatment, The fire extinguishing equipment comprising a fire nozzle 18 with a gas-dynamic propelling nozzle 20 is connected to two basic circuits, specifically the circuit I of air treatment with a diesel engine 47 with a screw compressor 50 and the circuit II of water and foam treatment, comprising a diesel engine 27 connected to a high-pressure pump 26.

The circuit I of air treatment comprises a fire nozzle 18 connected through the mixing chamber 19 to the inlet 2 of high-pressure air from the compressor 50. This inlet 23 is connected to an air control electromagnetic flow valve 58, which is through an air non-return flap 25 connected to a screw compressor 50 propelled by a diesel engine 47. The diesel engine 47 is equipped with a generator 48 and an accumulator 49 and with a control and synchronization unit 62 for its control. The diesel engine 47 is connected to a fuel system 51 for fuel supply.

The circuit II of water and foam treatment comprises a fire nozzle 18 connected through the mixing chamber 19 with the supply 24 of water and foam, which is connected to a water and foam mixer 33. The water and foam mixer 33 is connected to an injector 63 and an electromagnetic flow valve 61 of the extinguishing foam, connected to a tank 31 of foaming agent. Or the water and foam mixer 33 is connected to a water control electromagnetic flow valve 54, connected to a water no-return flap 3, connected to a high-pressure water pump 26 rotated by a gearbox 52 of the diesel engine 27. The diesel engine 27 is equipped with a generator 3 and an accumulator 59. The diesel engine 27 is controlled by a control and synchronization unit 62 and it is connected to a fuel system 51 for fuel supply. The circuit II of water treatment also comprises two water collectors 55, 56, and depending on the circumstances it is possible to switch between the two. The collector 55 of utility water for the high-pressure pump 26 is connected to a suction strainer 57 (e.g., connected to a pond, river, water reservoir etc.). The other collector 56 of drinking water is connected to a municipal water supply network. The water filling pump 60 is connected to the high-pressure water pump 26.

Apart from these circuits I, II the fire extinguishing equipment is equipped with a remote control 34 to control the system control unit 2, connected to a rotating mechanism 22 of the fire nozzle 18, where the control unit 2 is connected to a thermal image detection 64, which provides it also with other data.

FIG. 2 shows a schematic longitudinal section of the fire nozzle 18. The fire nozzle 18 of a cylindrical shape comprises a mixing chamber 19, which is in the direction of flow, indicated by arrows, divided by a rear partition 36 and a front partition 37 to a chamber 40 for the supply of water, a chamber 41 for the supply of air and a dispersing chamber 39. The chamber 40 is equipped with water and foam supply 24. The chamber 41 is equipped with an inlet 23 of high-pressure air from the compressor 50. The dispersing chamber 39 is narrowed into a gas-dynamic propelling nozzle 20, from which a high-speed dispersive stream 21 comes out.

Between the rear partition 36 and the front partition 37 a mixing block 35 is situated, equipped with mixers 38, in between which gaps 42 are situated.

FIG. 3 shows a detail of an axonometric view of the mixing block 35 with the rear partition 36 and the front partition 37.

FIG. 4 shows one mixer 38 in longitudinal section, situated between the rear partition 36 with orifices 46 for suction of air and the front partition 37 with gaps 42. The mixer 38 is equipped with a confusor 43 and a diffusor 44.

As shown in the chart in FIG. 5, the smallest dispersion is attained with the air flow through one mixer 38 of 50-70 g/s. The selected diesel engine 4 with a screw compressor 50 provides for the flow of 1.35-1.5 kg/s of high-pressure air and in combination with the diesel engine 27, which propels the high-pressure pump 2 they make up in terms of volume such a water and air flow, for which it is necessary to use 33 mixers 38. Therefore the dimensions of the mixer 38 providing for the air supply from 41 to 45 g/s are selected.

A through-diameter of one mixer 38 ranges, e.g., from 10 to 12 mm and has been selected (FIG. 6) because of the minimum size of droplets of 150 micrometers at the water pressure of 10-14 bar and water flow of 60-70 l/s, which is ensured by the above-mentioned high-pressure water pump 26.

Figure 6:
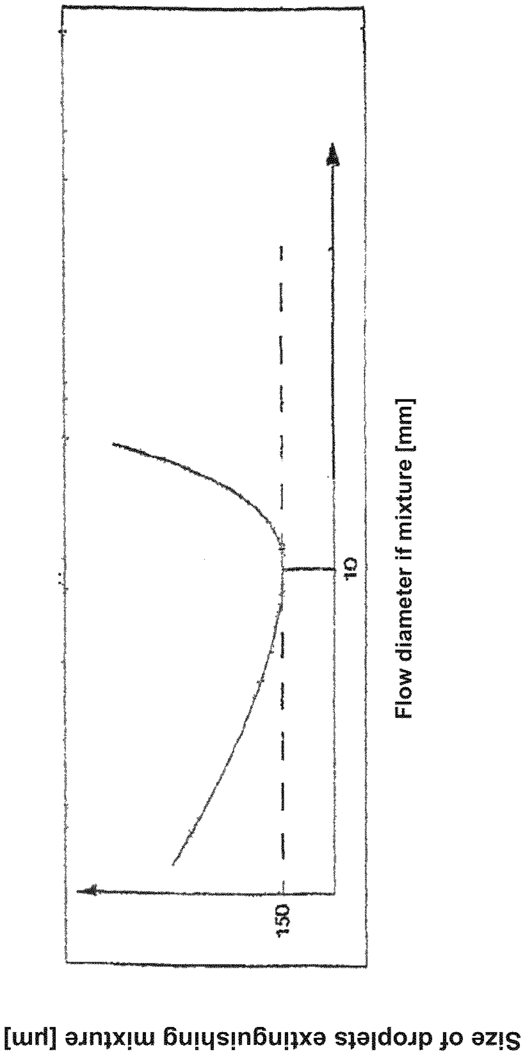
FIG. 6 shows on the vertical axis the size of droplets on the outlet form the mixer in micrometers, on the horizontal axis the flow diameter of the mixer in millimeters.

FIG. 6 shows the dependence of the size of droplets of the extinguishing mixture on the outlet from the mixer 38 in micrometers on the flow diameter of the mixer 38 in millimeters, where these values were obtained by way of an experiment.

Figure 7:
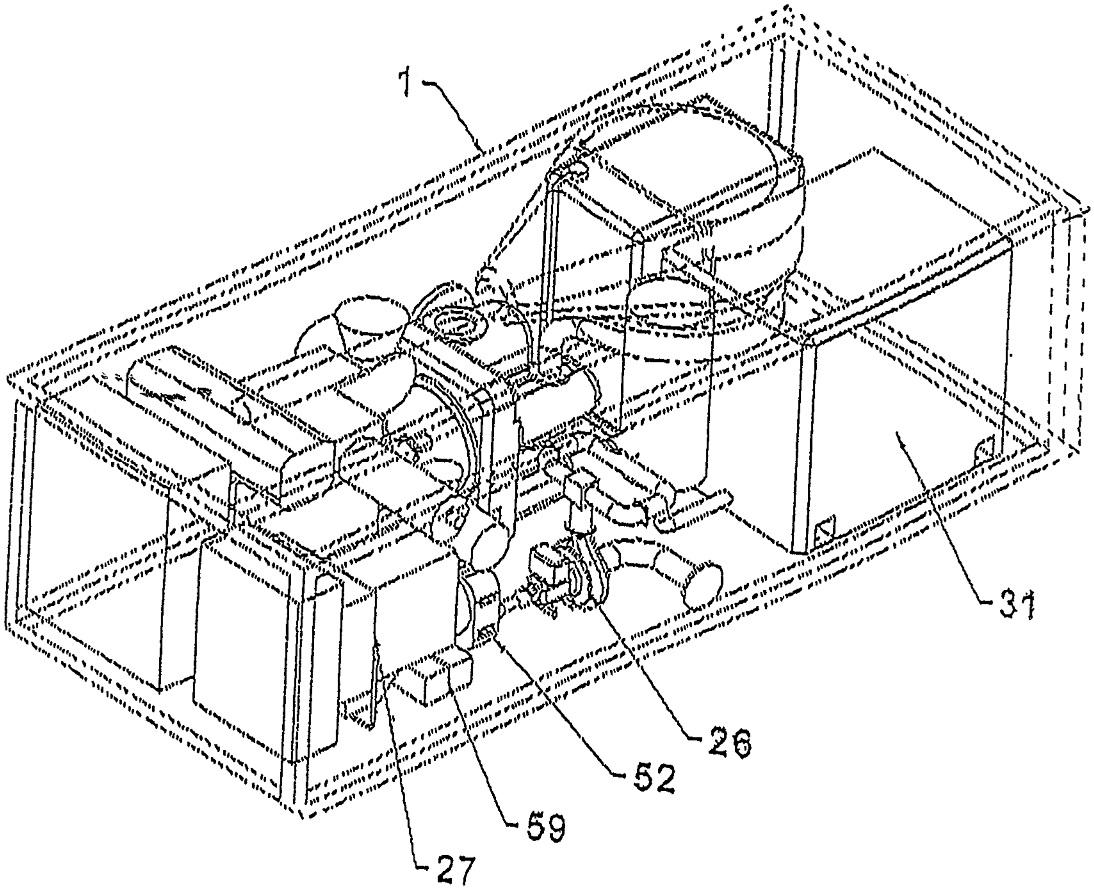
FIG. 7 shows an axonometric view of the fire extinguishing equipment from FIG. 1A from the side of the high-pressure water pump.
Figure 8:
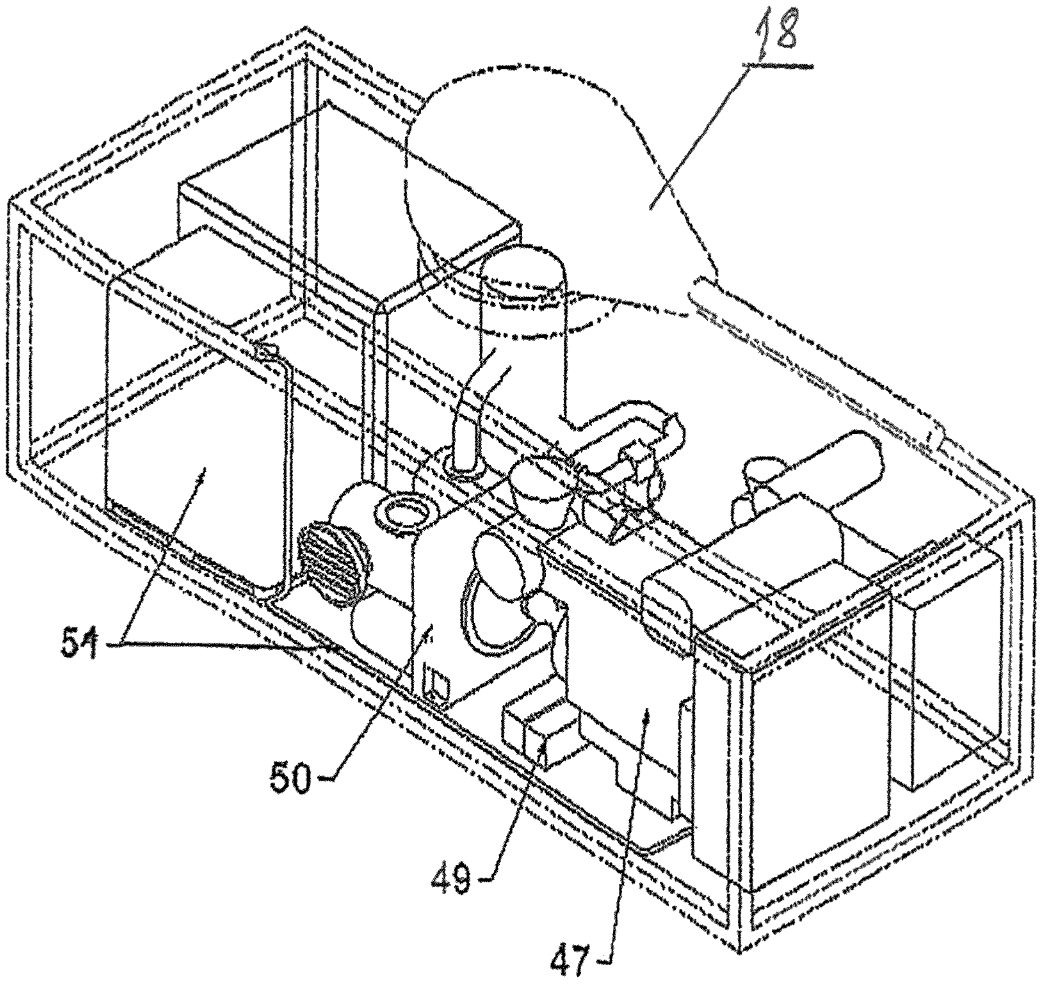
FIG. 8 shows an axonometric view of the fire extinguishing equipment from FIG. 7 from the opposite side from the side of the compressor.
Figure 9:
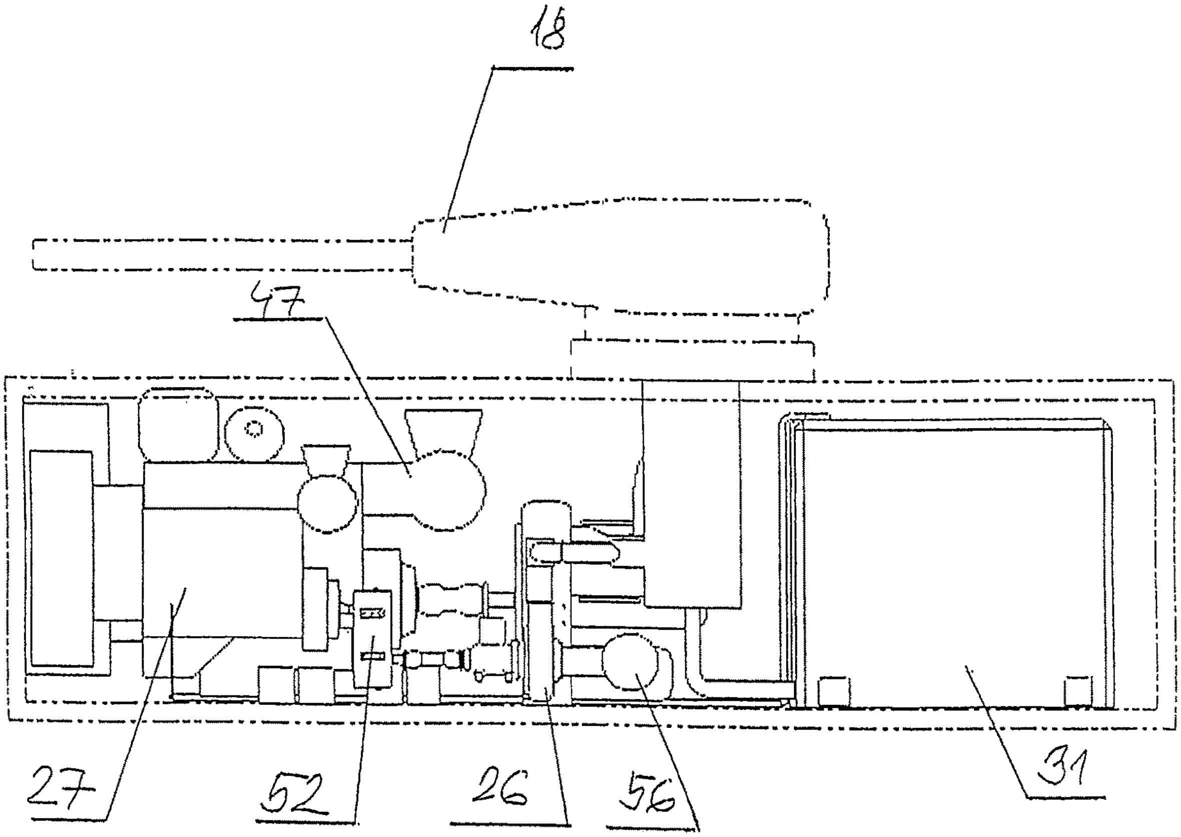
FIG. 9 shows a side view from FIG. 8.
Figure 10:
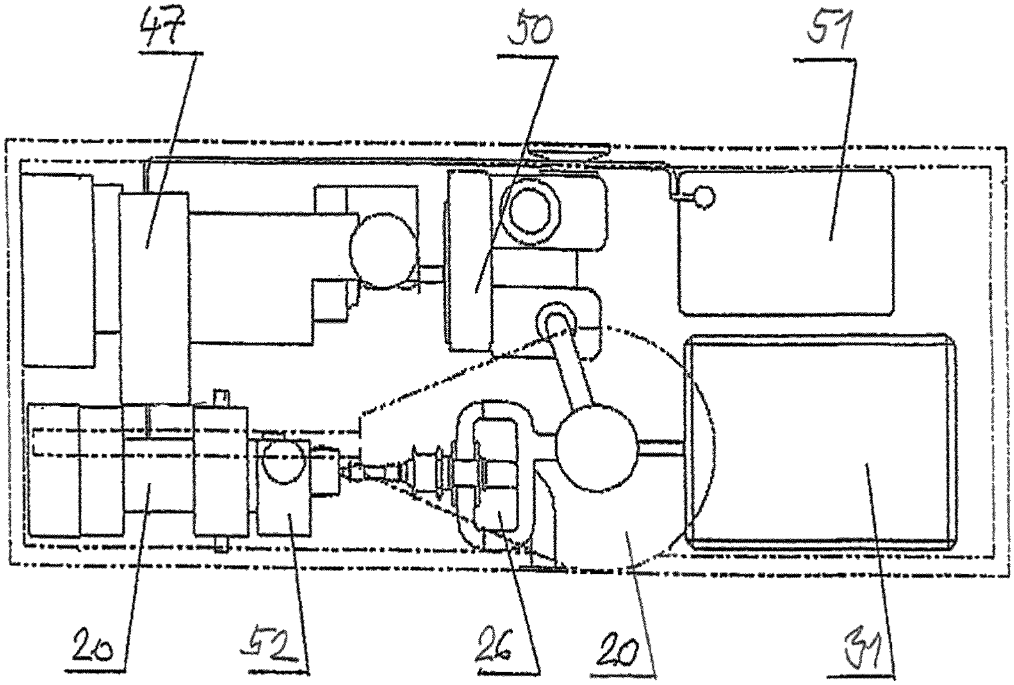
FIG. 10 shows a view from above of the fire extinguishing equipment from FIGS. 7 and 8.

FIGS. 7, 8 show axonometric views of the fire extinguishing equipment partly depicting the internal arrangement of the fire extinguishing equipment. FIG. 7 shows the fire extinguishing equipment from the side of the high-pressure water pump 26. FIG. 8 shows an axonometric view of the fire extinguishing equipment from the opposite side of the compressor 50. Both axonometric views in FIGS. 8 and 9 schematically depict the internal arrangement of the extinguishing technology. FIG. 9 shows a side view from FIG. 7, from which it is clear how the fire nozzle 18 is placed on the upper side of the container. FIG. 10 shows a view from above of the fire extinguishing equipment from FIGS. 7 and 8.

The Fire Extinguishing Equipment Works as Follows:

Internal diameter (caliber) of the mixer 38 has been selected based on the calculation of the water flow set point. Water consumption is selected based on the proportion of one weight part of air (gas) to 40-50 weight parts of water (liquid). Air volume is selected in regard to the required dispersion of droplets. The sizes of droplets range from 100 to 300 μm. For the given dispersion of droplets an air flow of 50-70 g/s is necessary, with the water flow through one mixer 38 in the amount of 2 000 g/s (2 kg/s). For the water flow of 60-70 l/s through the mixing chamber 19 a block of 33 (thirty-three) mixers 38 is used.

Preparation for Work

The fire extinguishing equipment is made ready for work provided by an operating standard as follows: The tank 31 gets filled with foaming agent and the fuel system 51, which provides for the operation of diesel engines 27, 47 gets filled. If the equipment is not stationary and it is not in the required distance from the source of fire, the equipment will be carried into the fire extinguishing zone.

Starting the Equipment:

By starting the fire extinguishing equipment the circuit I of air treatment (upper part of FIG. 1B) gets activated. The control unit 2 and the synchronization unit 62 start the diesel engine 47 and start the screw compressor 50 spinning at the necessary speed, required for sufficient air pressure for the air inlet 23 into the mixing chamber 19. The necessary air flow and pressure are evaluated by an air control electromagnetic flow valve 58. On the air pipe an air non-return flap 25 is placed, which prevents from flooding the compressor 50 with water. To reach the necessary air pressure, the circuit II of water treatment (lower part of FIG. 1B) gets activated automatically. The control unit 2 and the synchronization unit 62 start the diesel engine 27 of the high-pressure water pump 26, which through a gearbox 52, sets the water pump 26 into operation. Starting the diesel engine 27, is conditional upon flooding the water system by a filling pump 6 either using a collector 55 of utility water and a suction strainer 57 or a direct inlet of drinking water by a collector 56 from a water supply network.

The high-pressure water pump 26 supplies the extinguishing liquid from an external source and the screw compressor 50 blows compressed air into the mixing chamber 19. Then a mixture of droplets and gas is formed, which gains the operating speed in a gas-dynamic propelling nozzle 20, where a high-speed dispersive stream 21 is formed.

For the maximum fire ground coverage the fire nozzle 18 is rotated vertically and horizontally and rotates using a rotating mechanism 22. The fire extinguishing process is controlled either individually by an operator or automatically using a thermal image detection 64.

The parameters of a high-speed gas-dynamic stream 21 can be changed by setting the volume and pressure of supplied liquid, as well as by adjusting the air flow and pressure by the system control unit 2, which depending on the immediate needs evaluates data from the air electromagnetic flow valve 58 and water control electromagnetic flow valve 54. By the control and synchronization unit of diesel engines 62, speeds of both diesel engines (drives) 47, 62 can be regulated as necessary, and thus changing the performances of both the screw compressor 50, and the high-pressure pump 26 and this way also changing the parameters and volume of the gas-dynamic stream 21.

When necessary to extinguish the fire by foam a foaming agent, which fills the tank 31 is used. The electromagnetic flow valve 61 is opened and the foaming agent gets through the injector 63 and the foam and water mixer 33 foam into the mixing chamber 19 and together with water it gets into the fire nozzle 18. On the outlet of the fire nozzle 18 a foam is thereby formed, which crosses a distance of more than 100 meters, covers the seat of fire and prevents from the access of air.

The chamber 41 for the supply of air, is separated from the chamber 40 for the supply of water by a partition 36 of the block 35 of mixers and from the dispersing chamber 39 by a partition 37 of the block of 35 mixers. Mixers 38 are fixed on a partition 36 of the mixing block 35 and enter by the gaps 42 with the front part into the orifices of the partition 37 of the block of mixers. The mixers 38 are pipe components of a flow cross-section selected by way of an experiment. On the rear partition 36 there is a confusor 43 (liquid inlet) located, behind which is a cylindrical component 45 (of a constant cross-section) with radial-placed orifices 46 for air suction and with a diffusor 44.

Led to the inlet 24 for the supply of liquid 40 of the mixing chamber 19, is either water under pressure from the pump 2 or a mixture of water and foaming agent from the water foam mixer 33, which gets into confusors 43 of the mixers 35 and goes through the cylindrical component 45 of mixers 38 and then through diffusors 44 into the mixers 38. At the same time a negative pressure is generated in the mixer 38, which facilitates air suction through the orifices 46 of the block 35 of mixers 38 from the chamber 41 for the supply of air into the mixing chamber 19. Air goes through the inlet 23 out of the compressor 50 of the diesel engine 41. A part of air goes through the gaps 42 between mixers 38 and the walls of the orifices 46 of the rear partition 36 of the block 35 of mixers, and then it enters the dispersing chamber 39 of the mixing chamber 19 of the fire nozzle 18.

In the process the gaseous medium is divided into two streams: the first one forms a two-phase bubble-structured stream and the second one propels in the gas-dynamic propelling nozzle 20 a high-pressure stream 21 of a dispersive structure. The two-phase bubble-structured stream is generated by mixing the first gas stream with a liquid in the cylindrical component 45 or after its prior acceleration for the reduction of pressure in the dispersing chamber 39 of the mixing chamber 19.

The bubble stream from each of the diffusers 44 of mixers 38 is led into the dispersing chamber 39, where intensive destruction takes place and its structure gets changed, possibly generating shock waves, depending on the parameter values, i.e. the bubble structure is transformed into a dispersed structure, with the formation of tiny droplets.

The second stream of gas at the same time enters the dispersing chamber 39 of the mixing chamber 19 of liquid and gas, where a mixture of droplets and gas is formed by mixing the second stream with the dispersed stream. The mixture of droplets and gas so formed is led into the gas-dynamic propelling nozzle 20, where it gains a predetermined speed and on the outlet from the nozzle 20 it forms a high-speed dispersive stream 21 with tiny dispersed droplets.

The applicant made and successfully tested prototypes of the proposed fire extinguishing equipment according to the present invention. It has been proved by the tests, that the equipment provides for the lowering of the consumption of extinguishing liquid and foam; high dispersion of droplets of the extinguishing liquid; an uninterrupted operation in extremely high temperatures of the surrounding air up to plus 60 degrees Celsius.

For the said example embodiment and for attaining of the gas-dynamic stream 21 the parameters below were applied.

For the selected water flow $P_w$(l/s) (from the pump 26) and for the given air flow $P_a$ (kg/sec) (from the compressor 50), the number of mixers 38 is determined e.g., as follows: water flow $P_w$ is 60-70 $l \cdot s^{-1}$ at a pressure of 8-14 bar and air flow $P_a$ is 1.2-2.1 $kg \cdot s^{-1}$ at a pressure of 8-10 bar.

For these parameters, a mixing chamber 19 for 33 (thirty three) mixers 38 was designed, with an optimum water flow $P_w$ to air flow $P_a$ ratio of 40-28 established by way of an experiment.

It was found by way of an experiment and making, that fire extinguishing by a far-reach dispersive stream 21 is most effective when droplets sizes range from 100 μm to 300 μm, for which the air to water weight ratio must be 1:(40-28). When the water flow through one mixer ranges from 1.9 to 2.1 l/s and several parallel-working mixers 38 are used, an extinguishing stream with a longer reach is formed. To reach the water flow in the mixing chamber 19 ranging from 60 to 70 liters/s a block of 30-33 mixers must be used.

The mixer 38 consumption was calculated based on a consideration of liquid and gas mixing evenly, which is influenced both by the speed of liquid, and by the pressure and volume of air supplied into the mixing chamber 19. The speed of liquid depends on the cross section and pressure, which is generated by the pump 26.

INDUSTRIAL APPLICABILITY

The fire extinguishing equipment with fire fighting nozzle 18 produces a highly dispersed gas-dynamic stream with a reach to a height of up to 80 m high and to a distance of up to 120 m.

REFERENCE MARKS

1 mounting frame 1
2 control unit 2
3 electro generator
4 engine 4 with a gas turbine 5
5 gas turbine 5 of the gas-turbine engine 4
6 combustion 6 chamber of the gas-turbine engine 4
7 compressor 7 of the gas-turbine engine 4
8 fuel system 8 of the gas-turbine engine 4
9 pump 9 for water injection
10 drive 10 of the pump 9 for water injection
11 filter 11 for fine water purification
12 collector 12 of water
13 turn-on 13 valve for water injection
14 jets 14 for spraying water into the compressor 7 of the gas-turbine engine 4
15 jets 15 for spraying a superheated steam into the combustion chamber 6 of the gas-turbine engine 4
16 jets 16 for water injection into exhaust fumes of the gas-turbine engine 4
17 heat exchanger 17
18 fire (fighting) nozzle 18
19 mixing chamber 19
20 gas-dynamic propelling nozzle 20
21 high-speed dispersion stream 21
22 rotating mechanism 22 of the streamline
23 inlet 23 of high-pressure air from the compressor 50
24 supply 24 of water and foam into the mixing chamber 19
25 air non-return flag 25
26 high-pressure water pump 26
27 diesel engine (drive) 27 of the water pump 26
28 clutch 28
29 valve 29 for shutting off water or foam mixture
30 collector 30 of water for high-pressure pump 26
31 tank 31 of the foaming agent
32 valve 32 on the main foam supply
33 mixer 33 of foam and water
34 remote control 34
35 mixing block 35
36 rear partition 36
37 front partition 37
38 mixer 38
39 dispersing chamber 39 of the mixing chamber 19
40 chamber 40 for the supply of water

41 chamber 41 for the supply of air
42 gaps 42 between the partition 37 and the mixers 38
43 confusor 43
44 diffusor 44 of the mixer 38
45 cylindrical component 45 of the mixer 38
46 orifices 46 in the partition 37 for air suction of the mixer 38
47 diesel engine (drive)_47 of the compressor 50
48 generator 48 of the diesel engine 47
49 accumulator 49 of the diesel engine 47
50 screw compressor 50
51 fuel system 51 of the diesel engines 47 and 27
52 gearbox 52 of the high-pressure pump 26
53 water non-return flap 53
54 water control electromagnetic flow valve 54
55 collector 55 of utility water for the high-pressure pump 26
56 collector 56 of drinking water for the high-pressure pump 26
57 suction strainer 57 of utility water
58 air control electromagnetic flow valve 58
59 accumulator 59 of the diesel engine 47
60 water filling pump 60
61 foam electromagnetic flow valve 61
62 control and synchronization unit 62 of the diesel engines 47 and 27
63 injector
64 thermal image detection 64

The invention claimed is:

1. A fire extinguishing equipment with fire nozzle, comprising: a gas-dynamic propelling nozzle, connected to a mixing chamber with inlets for the supply of high pressure air and water and foam in the mixing chamber, a chamber for the formation of a two-phase bubble-structured stream, wherein the fire extinguishing equipment is equipped with a water pump, wherein the fire nozzle is connected to a compressor of a gas-turbine engine or the fire nozzle is connected to a screw compressor connected to a diesel engine, the mixing chamber configured for the formation of a high-speed two-phase dispersive stream of a bubble structure is made in the form of a block of mixers having front partition and rear partitions, between the front and rear partitions are located pipe mixers, the rear partition is located in the chamber, wherein the chamber has an inlet for the supply of water and foam and an inlet for the supply of high pressure air, the inlet for the supply of high pressure air is situated between the front and rear partitions, and an inlet orifice of each pipe mixer has a confusor connected to a chamber for the supply of water, the pipe mixers are fitted from a side of the rear partition with side orifices and outlet orifices of pipe mixers are equipped with diffusors, outlet ends of the diffusors with gaps are located in the outlet orifices of pipe mixers in the front partition, and the required number of pipe mixers is defined so that as the total flow of pressurized water through one mixer is 1.9 to 2.1 litres per second and the flow of compressed air from the compressor through one mixer is 40 to 28 litres per second.

2. The fire extinguishing equipment with fire nozzle, of claim 1, wherein on an outlet from the fire nozzle a high-speed dispersive stream emerging from the fire nozzle has droplets of sizes 100-300 μm at a weight ratio of 1:(40 to 28) of the compressed air to pressurized water and at the pressurized water flow through one mixer of 1.9-2.1 litres per second.

3. The fire extinguishing equipment with fire nozzle of claim 1, wherein the mixing chamber is in a direction from the water and foam inlet to gas-dynamic propelling nozzle separated by front and rear partitions to three chambers, specifically a chamber for the supply of water, aligning with a chamber for supply of air, aligning with a dispersing chamber of the mixing chamber, where the dispersing chamber narrows into the gas-dynamic propelling nozzle, from which a high-speed dispersive stream comes out.

4. The fire extinguishing equipment with fire nozzle of claim 1, wherein the fire extinguishing equipment comprises a control unit, which is equipped with a remote control and is connected to an electro generator.

5. The fire extinguishing equipment with fire nozzle of claim 1, wherein the fire nozzle is connected to a means for rotating the fire nozzle vertically and horizontally.

6. The fire extinguishing equipment with fire nozzle of claim 1, wherein the inlet for supply of water and foam into a mixing chamber is connected through the high-pressure water pump, the high-pressure water pump including a tank of foaming agent.

7. The fire extinguishing equipment with fire nozzle of claim 1, wherein the fire nozzle is connected through an air non-return flap to the compressor of a gas-turbine engine with a gas turbine, the gas turbine is equipped with a combustion chamber for fuel combustion and a heat exchanger for the cooling of the combustion chamber and the combustion chamber is connected to the compressor of the gas-turbine engine and with a fuel system, where the pump for water injection is connected to jets, specifically the jet for spraying water into the compressor of the gas-turbine engine, and it is further connected to the jet for the injection of superheated steam into the combustion chamber of the gas-turbine engine and it is also connected to the jet for the injection of water into exhaust fumes of the gas-turbine engine.

8. The fire extinguishing equipment with fire nozzle of claim 1, wherein the fire nozzle is connected to the screw compressor connected to the diesel engine, and wherein the fire nozzle is connected to two separate basic circuits, including:

a circuit (I) of compressed air treatment with the diesel engine with the screw compressor; and a circuit (II) of pressurized water and foam treatment, including a second diesel engine connected to a high-pressure water pump.

9. The fire extinguishing equipment with fire nozzle of claim 8, wherein the circuit (I) of compressed air treatment includes an inlet of high-pressure air from the compressor, this inlet is connected to an air control electromagnetic flow valve, which is through an air non-return flap connected to a screw compressor propelled by the diesel engine, which is equipped with a generator and an accumulator, is fitted with a control and synchronization unit and is connected to a fuel system.

10. The fire extinguishing equipment with fire nozzle of claim 8, wherein:

the circuit (II) of pressurized water and foam treatment includes water and foam supply through the inlet into the mixing chamber, the water and foam inlet are connected to a water and foam mixer, the water and foam mixer are connected to an extinguishing foam injector and electromagnetic flow valve, connected to a tank of foaming agent and also linked to a water control electromagnetic flow valve, connected to a water non-return flap, connected to a high-pressure water pump connected to a gearbox of the diesel engine, the diesel engine is equipped with a generator and an accumulator, the diesel engine being connected to the control and synchronization unit and also being linked to a fuel system, where the high-pressure water pump is connected to a utility water collector and to a suction strainer or to a drinking water collector connected to a municipal water supply network.

11. The fire extinguishing equipment with fire nozzle of claim 8, wherein the fire extinguishing equipment is equipped with a remote control to control a system control unit, connected to a means for rotating the fire nozzle vertically and horizontally, where the control unit is connected to a thermal image detection unit.

* * * * *